United States Patent
Shrimal et al.

(10) Patent No.: US 12,436,889 B1
(45) Date of Patent: Oct. 7, 2025

(54) CACHE CIRCUIT THAT SELECTIVELY STORES DATA BLOCKS TO DYNAMICALLY OPTIMIZE FOR READ AND WRITE TRANSACTIONS

(71) Applicant: QUALCOMM Incorporated, San Diego, CA (US)

(72) Inventors: Saurabh Kumar Shrimal, Noida (IN); Sandeep Dager, Ghaziabad (IN); Ravindra Kumar, Bengaluru (IN); Sahil Pandey, New Delhi (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/793,111

(22) Filed: Aug. 2, 2024

(51) Int. Cl.
   *G06F 12/08* (2016.01)
   *G06F 12/0802* (2016.01)

(52) U.S. Cl.
   CPC .............. *G06F 12/0802* (2013.01)

(58) Field of Classification Search
   CPC .................................. G06F 12/0802
   USPC ........................................ 711/118
   See application file for complete search history.

(56) References Cited

U.S. PATENT DOCUMENTS

2013/0179638 A1* 7/2013 Bratt .................. G06F 12/1027
                                                          711/205

\* cited by examiner

*Primary Examiner* — Jae U Yu
(74) *Attorney, Agent, or Firm* — W&T

(57) ABSTRACT

A cache circuit includes read address registers to store memory addresses of data blocks requested in recent memory read transactions in a memory circuit and write address registers to store memory addresses of the data blocks recently written to the memory circuit. The cache circuit also includes data registers for storing data blocks corresponding to select memory addresses stored in the read address registers and the write address registers based on a pattern of recent memory transactions. The selection of memory addresses for which corresponding data blocks are stored in the data registers is based on a mode count that may be dynamically determined based on the memory addresses accessed in the most recent memory transactions. The mode count depends on whether a requested data block is stored in the data registers and whether the memory address is stored in the read address registers or the write address registers.

24 Claims, 8 Drawing Sheets

CACHE CIRCUIT THAT SELECTIVELY
STORES DATA BLOCKS TO DYNAMICALLY
OPTIMIZE FOR READ AND WRITE
TRANSACTIONS

TECHNICAL FIELD

The technology of the disclosure relates generally to memory caches on integrated circuits (ICs) and, more particularly, to improving cache hit rates.

BACKGROUND

Processing circuits on integrated circuits (IC) may include processors and memory circuits interconnected by networks that allow multiple processors to access a same memory. In some ICs, multiple processors may be employed to execute instructions of a same application, causing a target memory address (or memory addresses) or a memory circuit to be accessed repeatedly. In some cases, the data at the target memory address may not be modified between memory read transactions. In other cases, data blocks at target memory addresses may be read immediately after being updated by a memory write transaction. Each access to a memory circuit consumes energy. The energy consumed by a memory circuit may be reduced by minimizing access to memory circuits. In this regard, a cache circuit may be employed to store copies of data blocks at a target address that was most recently read from or written to the memory because such data is expected to be the most likely data to be read in a next memory read transaction. The cache circuit can intercept the memory read transactions directed to the target memory address and respond by returning a copy of the corresponding data block back to a requesting processor. The cache circuit may be much smaller (e.g., many fewer circuits) than the memory circuit. Therefore, accessing the data block stored in the cache circuit uses less power than accessing the data block in the memory circuit. In a larger cache, in which more data blocks may be stored, the requested data from the target memory address is more likely to be available (e.g., "hit"). However, as the cache circuit size increases, the power savings advantage of the cache circuit over the memory circuit decreases. Thus, algorithms have been developed to attempt to optimize the "hit rate" of a cache circuit by determining which entries in the cache are least likely to cause a "hit" and, when the cache is full, overwriting those entries with new entries that are more likely to be accessed.

SUMMARY

Aspects disclosed herein include a cache circuit that selectively stores data blocks to dynamically optimize for read and write transactions. Related methods of dynamically optimizing the data blocks stored in a cache circuit are also disclosed. In processing systems in which a memory circuit may be accessed frequently by one or more processors, certain memory addresses may be repeatedly accessed. Power savings can be achieved by employing a cache circuit to store copies of data blocks that are likely to be repeatedly accessed and to respond to memory read transactions by returning a copy of the requested data block without accessing the memory circuit. The extent of power savings provided by the cache circuit depends on a "hit rate", which is a measure of how often the cache circuit contains a requested data block. The "hit rate" in a cache circuit may depend on an algorithm that determines which data blocks to keep and which data blocks to replace with a more recently accessed data block, which is more likely to be accessed again. The success of an algorithm may vary according to the system in which it is used and the software applications executed therein. Thus, a "hit rate" may be improved by dynamically adapting to the pattern of memory access transactions received in the memory circuit.

An exemplary cache circuit disclosed herein includes read address registers configured to store memory addresses of data blocks requested in the most recent memory read transactions in a memory circuit and write address registers configured to store memory addresses of the data blocks written to the memory circuit in the most recent memory write transactions. The cache circuit also includes data registers for storing data blocks corresponding to select memory addresses stored in the read address registers and the write address registers based on a pattern of recent memory transactions. The selection of memory addresses for which corresponding data blocks are stored in the data registers is based on a mode count that may be dynamically determined based on the memory addresses accessed in the most recent memory transactions. In some examples, the mode count may be adjusted based on whether a data block requested in a memory transaction is already stored in the data registers and whether the memory address of the accessed data block is already stored in one of the read address registers or one of the write address registers. In this regard, the mode count may be adjusted in response to a pattern of memory transactions to selectively store data blocks in the data registers to increase the hit rate.

In this regard, in one aspect, a cache circuit configured to couple to a memory circuit is disclosed. The cache circuit includes a plurality of read address registers configured to store memory addresses of data blocks requested from a memory circuit in most recent memory read transactions and a plurality of write address registers configured to store memory addresses of data blocks written to the memory circuit in most recent memory write transactions. The cache circuit further includes a plurality of data registers configured to selectively store, based on a mode count, the data blocks requested from the memory circuit in the most recent memory read transactions and the data blocks written to the memory circuit in the most recent memory write transactions. The cache circuit further includes a control circuit configured to receive a first memory read transaction requesting a first data block at a first memory address, generate a hit signal in an active state in response to determining that the first data block is stored in the plurality of data registers, return the first data block from the plurality of data registers in response to the hit signal, and adjust the mode count based on the first memory address.

In another aspect, an integrated circuit (IC) is disclosed. The IC includes a memory circuit, a plurality of processors configured to access write data blocks to the memory circuit and read data blocks from the memory circuit, and a cache circuit coupled to the memory circuit. The cache circuit includes a plurality of read address registers configured to store memory addresses of data blocks requested from the memory circuit in most recent memory read transactions and a plurality of write address registers configured to store memory addresses of data blocks written to the memory circuit in most recent memory write transactions. The cache circuit further includes a plurality of data registers configured to selectively store, based on a mode count, the data blocks requested from the memory circuit in the most recent memory read transactions and the data blocks written to the memory circuit in the most recent memory write transactions. The cache circuit further includes a control circuit configured to receive a first memory read transaction requesting a first data block at a first memory address, generate a hit signal in an active state in response to determining that the first data block is stored in the plurality of data registers, return the first data block from the plurality of data registers in response to the hit signal, and adjust the mode count based on the first memory address.

In another aspect, a method of a cache circuit coupled to a memory circuit is disclosed. The method includes storing, in a plurality of read address registers, memory addresses of data blocks requested from the memory circuit in most recent memory read transactions; storing, in a plurality of write address registers, memory addresses of data blocks written to the memory circuit in most recent memory write transactions; and selectively storing, in a plurality of data registers, based on a mode count, the data blocks requested from the memory circuit in the most recent memory read transactions and the data blocks written to the memory circuit in the most recent memory write transactions. The method further includes receiving a first memory read transaction requesting a first data block at a first memory address, generating a hit signal in an active state in response to determining that the first data block is stored in the plurality of data registers, returning the first data block from the plurality of data registers in response to the hit signal, and adjusting the mode count based on the first memory address.

DETAILED DESCRIPTION

Figure 1:
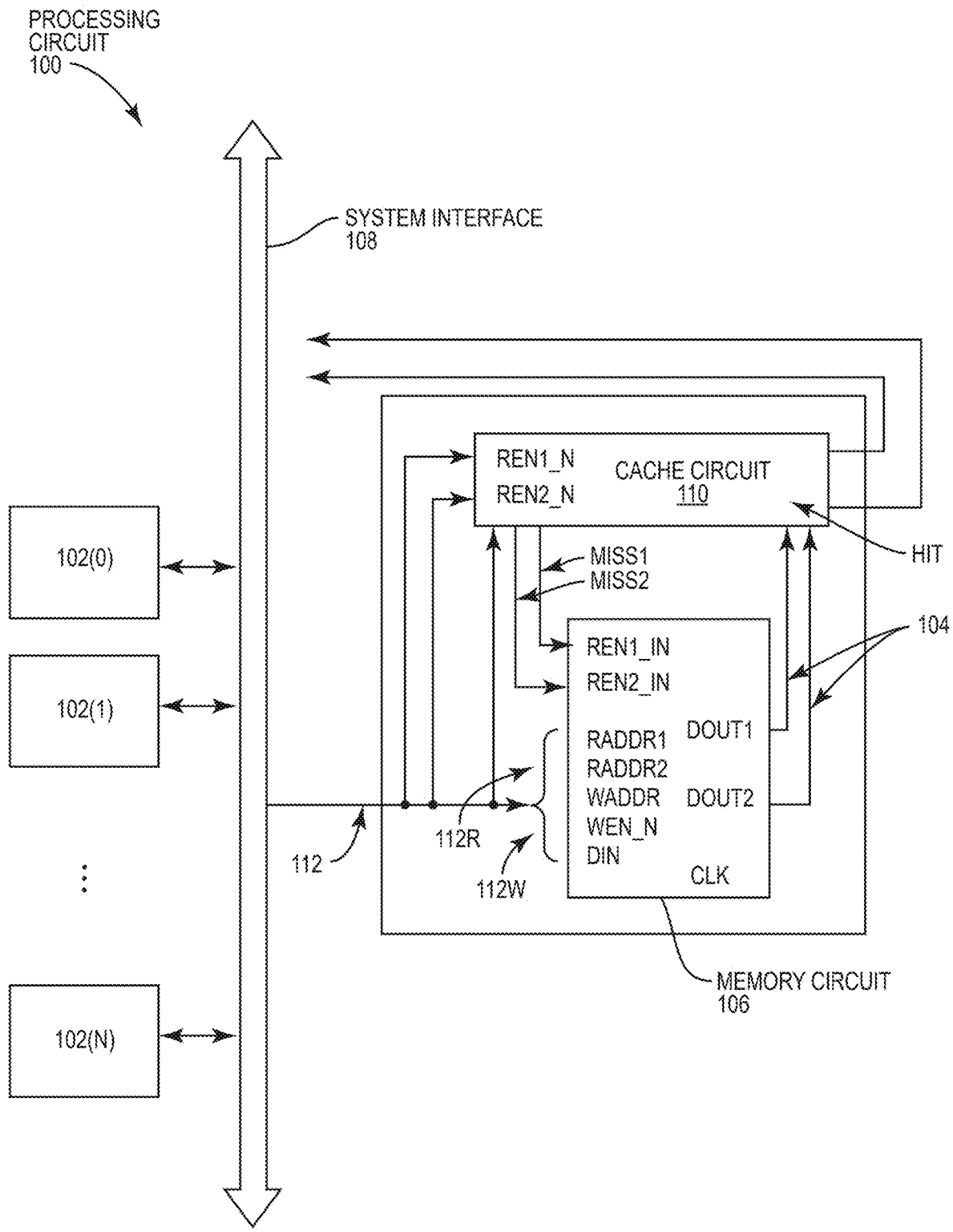
FIG. 1 is a schematic diagram of an exemplary processing system including processors that may access the same memory addresses of a memory circuit, wherein an exemplary cache circuit selects the data blocks to be stored for a higher hit rate based on a mode count that is determined by patterns of memory transactions.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include a cache circuit that selectively stores data blocks to dynamically optimize for read and write transactions. Related methods of dynamically optimizing the data blocks stored in a cache circuit are also disclosed. In processing systems in which a memory circuit may be accessed frequently by one or more processors, certain memory addresses may be repeatedly accessed. Power savings can be achieved by employing a cache circuit to store copies of data blocks that are likely to be repeatedly accessed and to respond to memory read transactions by returning a copy of the requested data block without accessing the memory circuit. The extent of power savings provided by the cache circuit depends on a "hit rate", which is a measure of how often the cache circuit contains a requested data block. The "hit rate" in a cache circuit may depend on an algorithm that determines which data blocks to keep and which data blocks to replace with a more recently accessed data block, which is more likely to be accessed again. The success of an algorithm may vary according to the system in which it is used and the software applications executed therein. Thus, a "hit rate" may be improved by dynamically adapting to the pattern of memory access transactions received in the memory circuit.

An exemplary cache circuit disclosed herein includes read address registers configured to store memory addresses of data blocks requested in the most recent memory read transactions in a memory circuit and write address registers configured to store memory addresses of the data blocks written to the memory circuit in the most recent memory write transactions. The cache circuit also includes data registers for storing data blocks corresponding to select memory addresses stored in the read address registers and the write address registers based on a pattern of recent memory transactions. The selection of memory addresses for which corresponding data blocks are stored in the data registers is based on a mode count that may be dynamically determined based on the memory addresses accessed in the most recent memory transactions. In some examples, the mode count may be adjusted based on whether a data block requested in a memory transaction is already stored in the data registers and whether the memory address of the accessed data block is already stored in one of the read address registers or one of the write address registers. In this regard, the mode count may be adjusted in response to a pattern of memory transactions to selectively store data blocks in the data registers to increase the hit rate.

FIG. 1 is a schematic diagram of an exemplary processing circuit 100, including processors 102(0)-102(N) that can access (e.g., read and/or write) data blocks 104 in a memory circuit 106 by way of a system interface 108. A cache circuit 110 coupled to the memory circuit 106 may also receive memory transactions 112 at the memory circuit 106. The memory transactions 112 include memory read transactions 112R and memory write transactions 112W. The cache circuit 110 may respond to the memory read transactions 112R by providing the requested data block 104 (e.g., a copy thereof) to the system interface 108 to thereby avoid the need for activating the memory circuit 106 as a power-saving measure. In this regard, the cache circuit 110 may store copies of data blocks 104 that are written to and read from the memory circuit 106 in case those data blocks are accessed in a subsequent memory read transaction 112R. The cache circuit 110 may also receive the memory write transactions 112W and may store data blocks 104 recently stored in the memory circuit 106.

As described in detail below, the cache circuit 110 selectively stores data blocks 104 from the most recent memory transactions 112 with the objective of achieving and maintaining a high "hit rate," which will minimize accesses to the memory circuit 106 and reduce energy consumption in the processing circuit 100. The data blocks 104 stored in the cache circuit 110 are selected from those corresponding to memory addresses targeted by the memory read transactions 112R and the memory write transactions 112W based on a pattern of the memory transactions 112.

The cache circuit 110 may be designated a 1W-2R type of memory circuit, having one write port and two read ports. The write port includes a write address input WADDR, a write enable input WEN_N, and a data input DIN. The read ports include, respectively, a first read address input RADDR1 and a first data output DOUT1, and a second read address input RADDR2 and a second data output DOUT2. The system interface 108 also provides a first read enable signal REN1_N and a second read enable signal REN2_N, which could be provided directly to the memory circuit 106 in the absence of the cache circuit 110. The memory circuit 106 and the cache circuit 110 are synchronized with the processors 102(0)-102(N) by a clock signal CLK.

Although the example in FIG. 1 is a 1W-2R type memory circuit, the exemplary cache circuit 110 may be employed with a memory circuit of any type, such as a 1W-1R, for example, which may be coupled to the processors 102(0)-102(N).

One or more of the processors 102(0)-102(N) may send a memory read transaction 112R on the system interface 108 to request a data block 104 from the memory circuit 106. In some examples, one of the processors 102(0)-102(N) may repeatedly access a same memory location of the memory circuit 106. In other examples, two or more of the processors 102(0)-102(N) may execute instructions of a same application, which causes them to access a same memory address or set of memory addresses in the memory circuit 106 containing data associated with the application. As noted, the memory transactions 112 are also received at the cache circuit 110. In response to a memory read transaction 112R, the cache circuit 110 may compare a memory address received on the first read address input RADDR1 to memory addresses of data blocks 104 stored in the cache circuit 110 to determine if the requested data blocks 104 are stored in the cache circuit 110.

When the read enable signal REN1_N is activated, if the read address input RADDR1 does not match a memory address of a data block 104 stored in the cache circuit 110 (a situation known as a "miss"), the cache circuit 110 generates a first miss signal MISS1 in an active state to the memory circuit 106 to inform the memory circuit 106 to respond to the memory read transaction 112R to the memory address on the read address input RADDR1. The cache circuit 110 also generates a "hit signal" HIT in an inactive state. In some examples, the hit signal HIT may be indicated by a first polarity of a binary signal, and the first miss signal MISS1 may be indicated by an opposite polarity of the binary signal. In other examples, the first miss signal MISS1 and the hit signal HIT may be separate binary signals. The first miss signal MISS1 may be provided to a first read enable input REN1_IN. In response to the first miss signal MISS1, the memory circuit 106 provides the data blocks 104 on the data output DOUT1, and the cache circuit 110 returns the requested data blocks 104 on the system interface 108. In response to a memory read transaction 112R indicated on the second read enable signal REN2_N, a second miss signal MISS2 may be provided to a second read enable input REN2_IN if the cache circuit 110 does not contain the data block 104 corresponding to the memory address on the read address input RADDR2.

On the other hand, if the read address input RADDR1 matches the memory address of the data block 104 (a situation described herein as a "hit" on the cache circuit 110), the cache circuit 110 generates a hit signal HIT in an active state and does not activate the miss signal MISS1. In response to the hit signal HIT, the cache circuit 110 provides, on the system interface 108, a copy of the requested data block 104 stored in the cache circuit 110 without activating the memory circuit 106. The data blocks 104 stored in the cache circuit 110 may be data blocks 104 that were recently written to or read from the memory circuit 106. The cache circuit 110 may adjust a selection of the data blocks 104 that are stored therein based on patterns of the memory transactions 112 to improve a hit rate of the cache circuit 110.

Figure 2A:
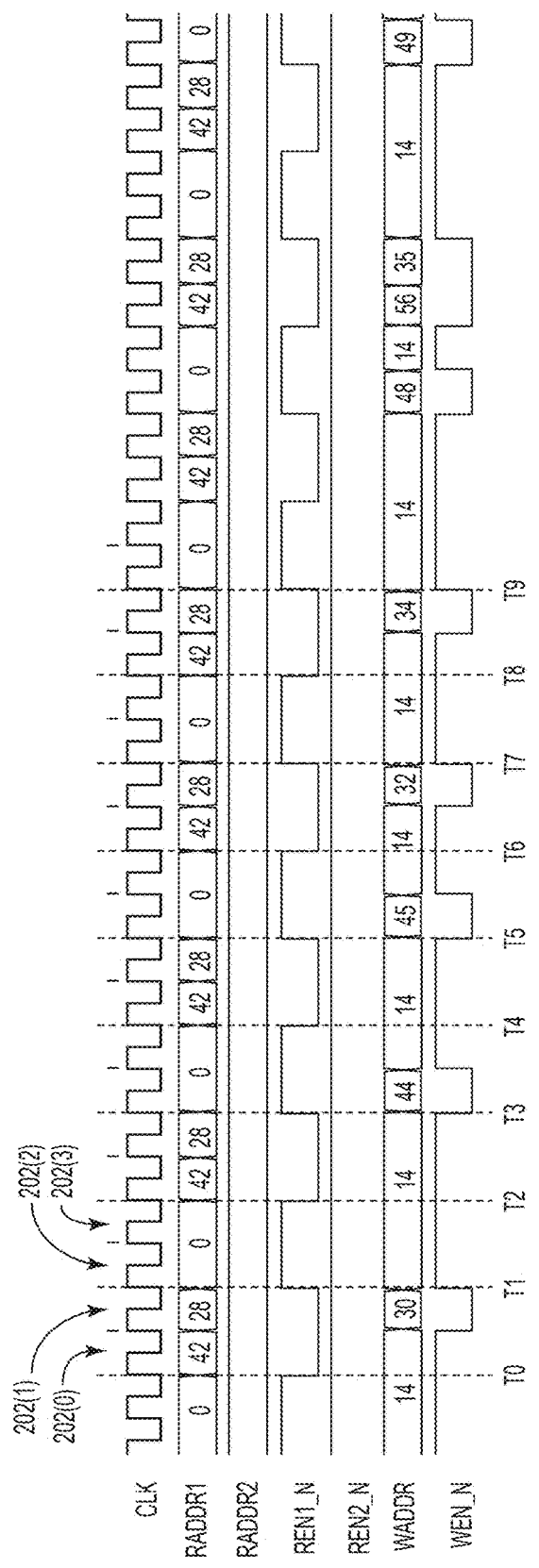
FIGS. 2A and 2B are timing diagrams of signals in a memory circuit to show patterns of memory transactions in which data of particular addresses may be repeatedly read without being updated or read immediately after being updated, respectively.

FIG. 2A is a timing diagram of a first example of signals in the memory circuit 106 in FIG. 1 to show patterns of memory transactions 112 that may be received in the memory circuit 106 and the cache circuit 110. In this example, data blocks 104 of certain addresses are repeatedly requested in memory read transactions 112R without being written/updated by memory write transactions 112W.

Figure 2B:
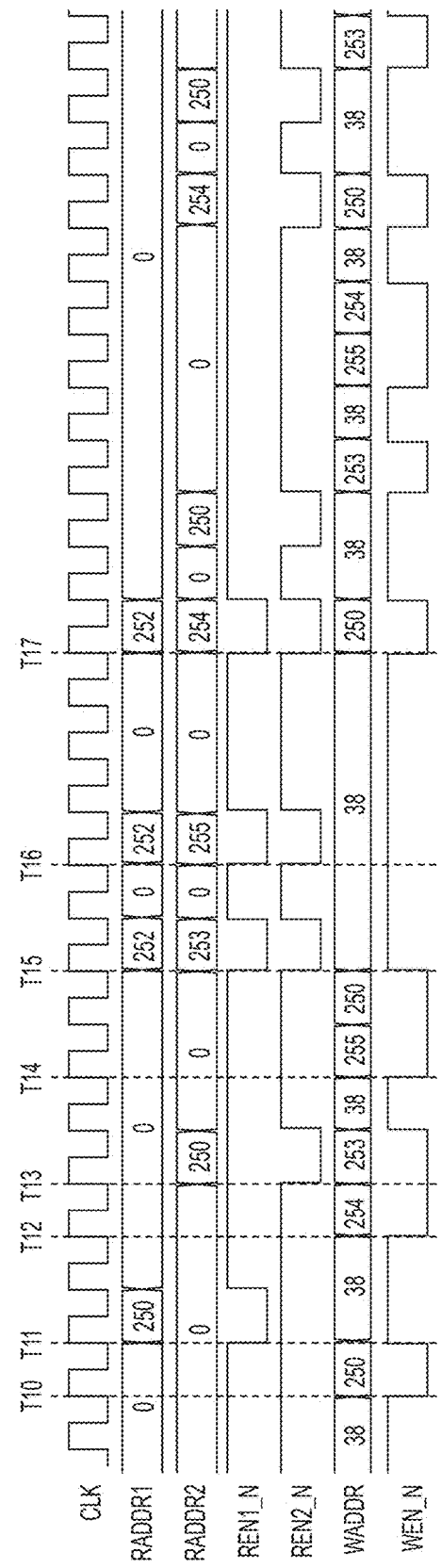

The first read enable signal REN1_N in the examples herein is low active, as indicated by the "_N" in the signal name. Not shown in FIGS. 2A and 2B is the miss signal MISS1 from the cache circuit 110 to the memory circuit 106 because FIG. 2 is provided primarily to show examples of memory transactions 112 on the system interface 108. At time T0 in FIG. 2A, the first read enable signal REN1_N is activated (e.g., set to a low voltage), as indicated by the drop from a high level to a low level, which correspond to the binary "1" position to the binary "0" position, and remains active for two cycles (202(0) and 202(1)) of the clock signal CLK, indicating two read transactions. During the first clock cycle 202(0), the read address input RADDR1 is set to a value of "42," indicating that the requested data block 104 is located at memory address "42" in the memory circuit 106. In the second clock cycle 202(1), the read address input RADDR1 is set to a value of "28," indicating that the requested data block 104 is located at memory address "28" in the memory circuit 106. Also occurring in the second clock cycle 202(1), the write enable signal WEN_N is activated, and the write address input WADDR is set to a value of "30", indicating that a data block 104 is being written to the address "30" in the memory circuit 106. Since the memory address "30" is different from the memory address "28" which is being read in the second clock cycle 202(1), there is no interference between the memory read transaction 112R and the memory write transaction 112W. The first read enable signal REN1_N is deactivated (e.g., returned to the binary "1" position) at time T1, ending the memory read transactions 112R.

Starting at time T2, the first read enable signal REN1_N is activated again in clock cycles 202(2) and 202(3) to read the memory addresses "42" and "28" from the memory circuit 106. The first read enable signal REN1_N is deactivated after the clock cycle 202(3), and, at time T3, a memory write transaction 112W updates the data block 104 at memory address "44" of the memory circuit 106. In response to the read enable signal REN1_N, at times T4 to T5, T6 to T7, T8 to T9, and so on, memory addresses "42" and "28" are read repeatedly in subsequent memory read transactions 112R without the data blocks 104 at those memory addresses being updated by the memory write transactions 112W.

In the pattern of memory transactions 112 shown in FIG. 2A, copies of the data blocks 104 corresponding to the memory addresses "42" and "28" could have been stored in the cache circuit 110 before the memory read transactions 112R at times T0 to T1. Because those data blocks 104 were not changed, the copies of the data blocks 104 corresponding to memory addresses "42" and "28" could have been returned by the cache circuit 110 in response to each of the memory read transactions 112R (e.g., at times T2 to T3, T4 to T5, T6 to T7, T8 to T9, and so on) without activating the memory circuit 106, to save a significant amount of power that would otherwise be consumed by the memory circuit 106.

FIG. 2B is a timing diagram of a second example of signals in the memory circuit 106 in FIG. 1 to show patterns of memory transactions 112 in which data blocks 104 are read immediately after being updated. At time T10, the write enable signal WEN_N is activated to write a data block 104 to the memory address "250" in the memory circuit 106, as indicated by the "250" on the write address input WADDR. At time T11, a memory read transaction 112R requests the data block 104 at memory address "250," as indicated on the read address input RADDR1. The data block 104 at the memory address "250" is requested again in another memory read transaction 112R as indicated on the second read address input RADDR2 at time T13.

At times T12 and T13, the data blocks 104 at memory addresses "254" and "253", respectively, are written, and at time T14, the data block 104 at memory address "255" is updated in the memory circuit 106. Shortly thereafter, at times T15, T16, and T17, the data blocks 104 corresponding to memory addresses "253", "255", and "254," respectively, are requested in memory read transactions 112R, as indicated on the second read enable signal REN2_N and the read address input RADDR2. Repetitive memory read transactions 112R to memory address "252" also occur at times T15, T16, and T17, as indicated by the read enable signal REN1_N and the read address input RADDR1.

In the examples in FIG. 2A described above, the data blocks 104 at the memory addresses "42" and "28" were repeatedly read without being updated. Based on that pattern of memory transactions 112, the hit rate in the cache circuit 110 would be improved by only storing data blocks 104 of the most recent memory read transactions 112R. On the other hand, in the examples in FIG. 2B, although the data block 104 at the memory address "252" was read repeatedly without being changed, as in FIG. 2A, the hit rate may have benefited from also storing data blocks 104 corresponding to the memory addresses of the most recent memory write transactions 112W (e.g., 250, 253, 254, 255) for which the data blocks were read immediately after being written/updated. Thus, it has been determined that selectively storing data blocks 104 of the most recent memory transactions 112 based on a pattern of the memory read transactions 112R and the memory write transactions 112W can improve the hit rate of the cache circuit 110 to reduce the power consumption of the memory circuit 106.

Figure 3:
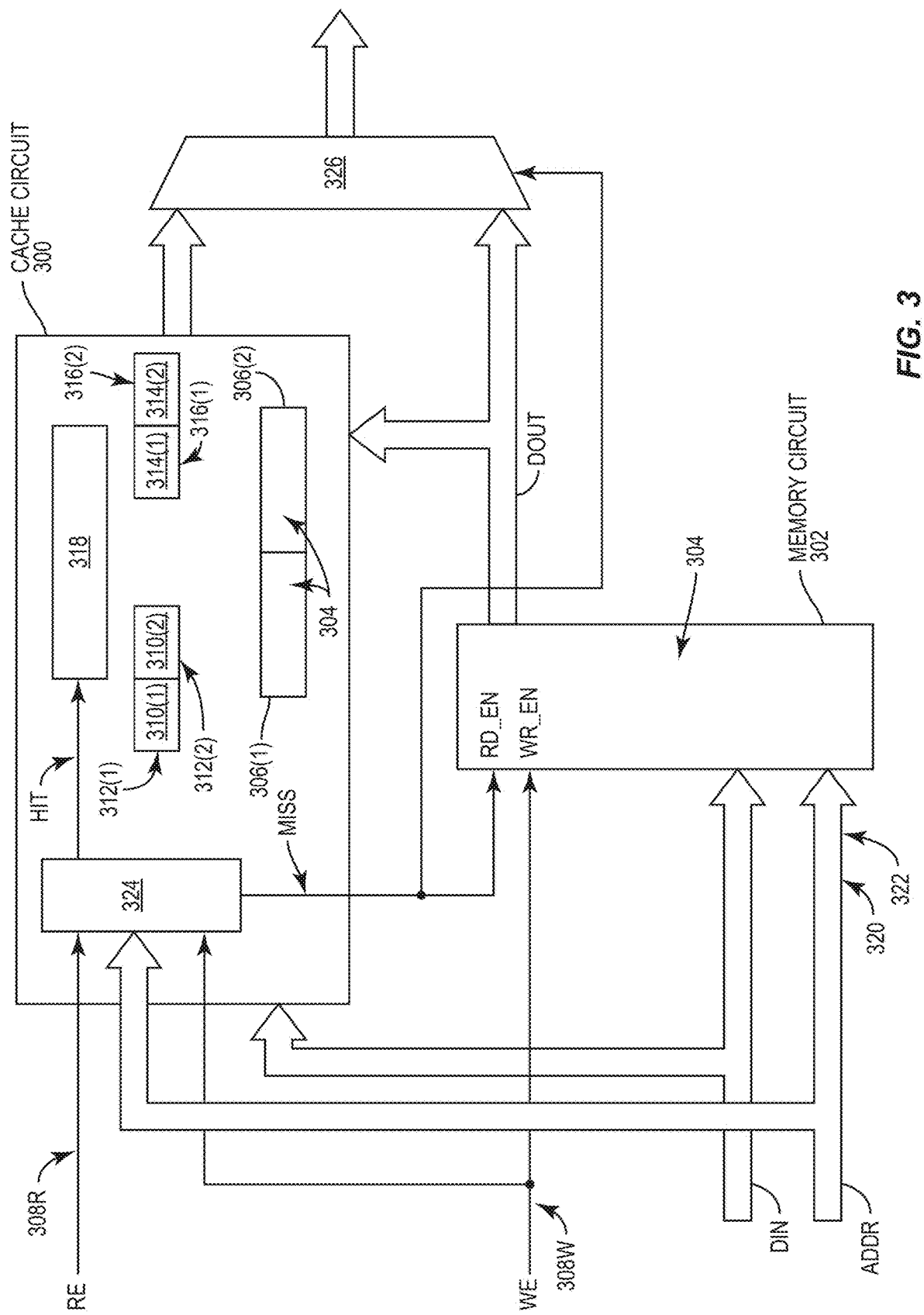
FIG. 3 is a first example of an exemplary cache circuit coupled to a memory circuit and configured to select data blocks to be stored for a higher hit rate based on a mode count that is determined by patterns of memory transactions.

FIG. 3 is a first example of an exemplary cache circuit 300 coupled to a memory circuit 302 and configured to select data blocks 304 stored in data registers 306(1) and 306(2) for a high hit rate on the cache circuit 300. For memory write transactions 308W, indicated by a write enable signal WE, the memory circuit 302 receives an address input ADDR, a data input DIN, and a write enable input WR_EN from a processor (not shown). For memory read transactions 308R indicated by a read enable signal RE at the cache circuit 300, the memory circuit 302 receives a miss signal MISS at a read enable input RD_EN from the cache circuit 300 when the cache circuit 300 does not have the data block 304 requested in a memory read transaction 308R. The selection of data blocks 304 to be stored in the data registers 306(1), 306(2) is based on patterns of memory transactions 308, which include memory read transactions 308R and memory write transactions 308W. The data registers 306(1), 306(2) are configured to selectively store, based on a mode count MC, the data blocks 304 requested from the memory circuit 302 in the most recent memory read transactions 308R, and the data blocks 304 written to the memory circuit 302 in the most recent memory write transactions 308W. Generation and use of the mode count MC are explained in detail with reference to FIG. 4.

The cache circuit 300 includes read address registers 310(1) and 310(2) that store memory addresses 312(1) and 312(2), respectively, of the data blocks 304 requested from the memory circuit 302 in the most recent memory read transactions 308R. The cache circuit 300 also includes write address registers 314(1) and 314(2) configured to store memory addresses 316(1) and 316(2), respectively, of the data blocks 304 written to the memory circuit 302 in the most recent memory write transactions 308W. A control circuit 318 in the cache circuit 300 controls the selection of the data blocks 304 stored in the data registers 306(1), 306(2) from among the data blocks 304 corresponding to the memory addresses 312(1), 312(2), 316(1), and 316(2). In the context herein, a data block 304 corresponding to a particular memory address is the data block 304 stored at the particular memory address in the memory circuit 302. In addition, the control circuit 318 may keep track of which of the read address registers 310(1), 310(2) is associated with the most recent memory read transaction 308R and which is not the most recent to identify which should be updated in response to a new memory transaction 308. Similarly, the control circuit 318 may keep track of which of the write address registers 314(1), 314(2) is associated with the most recent memory write transaction 308W and which is not the most recent. The mode count MC may also be generated in the control circuit 318.

During operation, the cache circuit 300 receives a first memory read transaction 308R requesting a first data block 304 at a first, read memory address 320, and the cache circuit 300 generates a hit signal HIT in response to determining that the first data block 304 is stored in the plurality of data registers 306(1), 306(2). The cache circuit 300 returns a copy of the first data block 304 from the plurality of data registers 306(1), 306(2) in response to the hit signal HIT and adjusts the mode count MC based on the read memory address 320.

In the example of the cache circuit 300 in FIG. 3, the data registers 306(1), 306(2) are configured to store two (2) of the data blocks 304 that were requested from the memory circuit 302 in the most recent memory read transactions 308R and written to the memory circuit 302 in the most recent memory write transactions 308W. That is, the data registers 306(1), 306(2) may, for example, store the two data blocks 304 most recently requested from the memory circuit 302, the two data blocks 304 most recently written to the memory circuit 302, or the data block 304 most recently read from and the data block 304 most recently written to the memory circuit 302. In other words, the data registers 306(1), 306(2) may store data blocks 304 corresponding to the memory addresses 312(1), 312(2) in the read address registers 310(1), 310(2), or the memory addresses 316(1), 316(2) in the write address registers 314(1), 314(2), or the memory address 312(1) and the memory address 316(1), for example.

In some examples, the two most recently requested data blocks 304 may be requested in the two most recent memory read transactions 308R, in which each memory read transaction 308R requests a data block 304 from a different memory address. In other examples, the most recently requested data block 304 corresponding to memory address 312(1) may be requested repeatedly in multiple (e.g., five) consecutive memory read transactions 308R, and the second most recently read data block 304 corresponds to an earlier memory read transaction directed to a different memory address.

Returning to the operation discussed above, in situations in which the data block 304 corresponding to the read memory address 320 is not already (e.g., prior to the memory transaction 308) stored in either of the data registers 306(1), 306(2), the hit signal HIT is not activated, so the miss signal MISS is provided to the memory circuit 302, which outputs the data block 304 on the data output DOUT. In some situations in which the data block 304 corresponding to the read memory address 320 is not already stored in either of the data registers 306(1), 306(2), the read memory address 320 may already be stored in one of the read address registers 310(1), 310(2). If the read memory address 320 is not already stored in one of the read address registers 310(1), 310(2), the older of the memory addresses 312(1) and 312(2) may be updated to be the read memory address 320. However, if the read memory address 320 is already stored in one of the read address registers 310(1), 310(2), none of the read address registers 310(1), 310(2) are modified, but the mode count MC may be updated, as described below. One of the data registers 306(1), 306(2) may be updated to contain a copy of the data block 304 corresponding to the read memory address 320.

The cache circuit 300 also receives the memory write transactions 308W that are provided to the associated memory circuit 302. A memory write transaction 308W writes a data block 304 to a write memory address 322 in the memory circuit 302. In some examples, the data block 304 corresponding to the write memory address 322 has not been recently written to the memory circuit 302. In such examples, the write memory address 322 may not already be stored in the write address registers 314(1), 314(2) as one of the memory addresses 316(1), 316(2), and the data block 304 corresponding to the write memory address 322 may not already be stored in the data registers 306(1), 306(2). In response to the memory write transaction 308W in such examples, the write memory address 322 may be written in one of the write address registers 314(1), 314(2), and the corresponding data block 304 may be written in one of the data registers 306(1), 306(2), depending on the mode count MC. In addition, the mode count MC may be updated.

In other examples, the data block 304 corresponding to the write memory address 322 is not already stored in one of the data registers 306(1), 306(2), but the write memory address 322 is already stored in one of the write address registers 314(1), 314(2). In this example, the data block 304 corresponding to the write memory address 322 may be written in one of the data registers 306(1), 306(2) in response to the memory write transaction 308W, depending on the mode count MC, and the mode count MC may be updated.

In further examples of the memory write transactions 308W, the data block 304 corresponding to the write memory address 322 may already be stored in one of the data registers 306(1), 306(2), and the write memory address 322 may already be stored in one of the write address registers 314(1), 314(2). In such examples, the mode count MC may be updated. but the data registers 306(1), 306(2) and the write address registers 314(1), 314(2) may remain unchanged.

Referring again to FIG. 3 in detail, a memory read transaction 308R causes the read enable signal RE to be activated and a read memory address 320 to be received on the address input ADDR. A logic circuit 324 in the cache circuit 300 determines, based on the mode count MC and the read memory address 320, whether the data block 304 corresponding to the read memory address 320 is already stored in either the data register 306(1) or the data register 306(2). If the read memory address 320 is found in one of the data registers 306(1), 306(2) (i.e., a hit situation), the logic circuit 324 generates the hit signal HIT and does not generate the miss signal MISS. The cache circuit 300 provides the data block 304 from one of the data registers 306(1), 306(2) to a multiplexor circuit 326, which returns the data block 304 to the requesting processor (see FIG. 1).

If the read memory address 320 is not stored in one of the data registers 306(1), 306(2), the logic circuit 324 generates the miss signal MISS which triggers the memory circuit 302 to provide the data block 304 to the multiplexor circuit 326. The miss signal MISS is employed to control the multiplexor circuit 326 to choose from data provided by the memory circuit 302 or by the cache circuit 300.

A memory write transaction 308W is indicated by activation of the write enable signal WE that is provided to the memory circuit 302 and the cache circuit 300. The memory circuit 302 receives the write memory address 322 on the address input ADDR, receives the data block 304 associated with the write memory address 322 on the data input DIN, and stores the data block 304 at the write memory address 322 in the memory circuit 302. The cache circuit 300 also receives the data block 304 and the write memory address 322. If the write memory address 322 is not already stored in one of the write address registers 314(1), 314(2), the cache circuit 300 may update one of the write address registers 314(1), 314(2) containing the older of the memory addresses 316(1), 316(2) to be the write memory address 322. The control circuit 318 selects, based on the write memory address 322 and the mode count MC, one of the data registers 306(1), 306(2) in which to store the data block 304, as explained in further detail with reference to FIG. 4 below.

Figure 4:
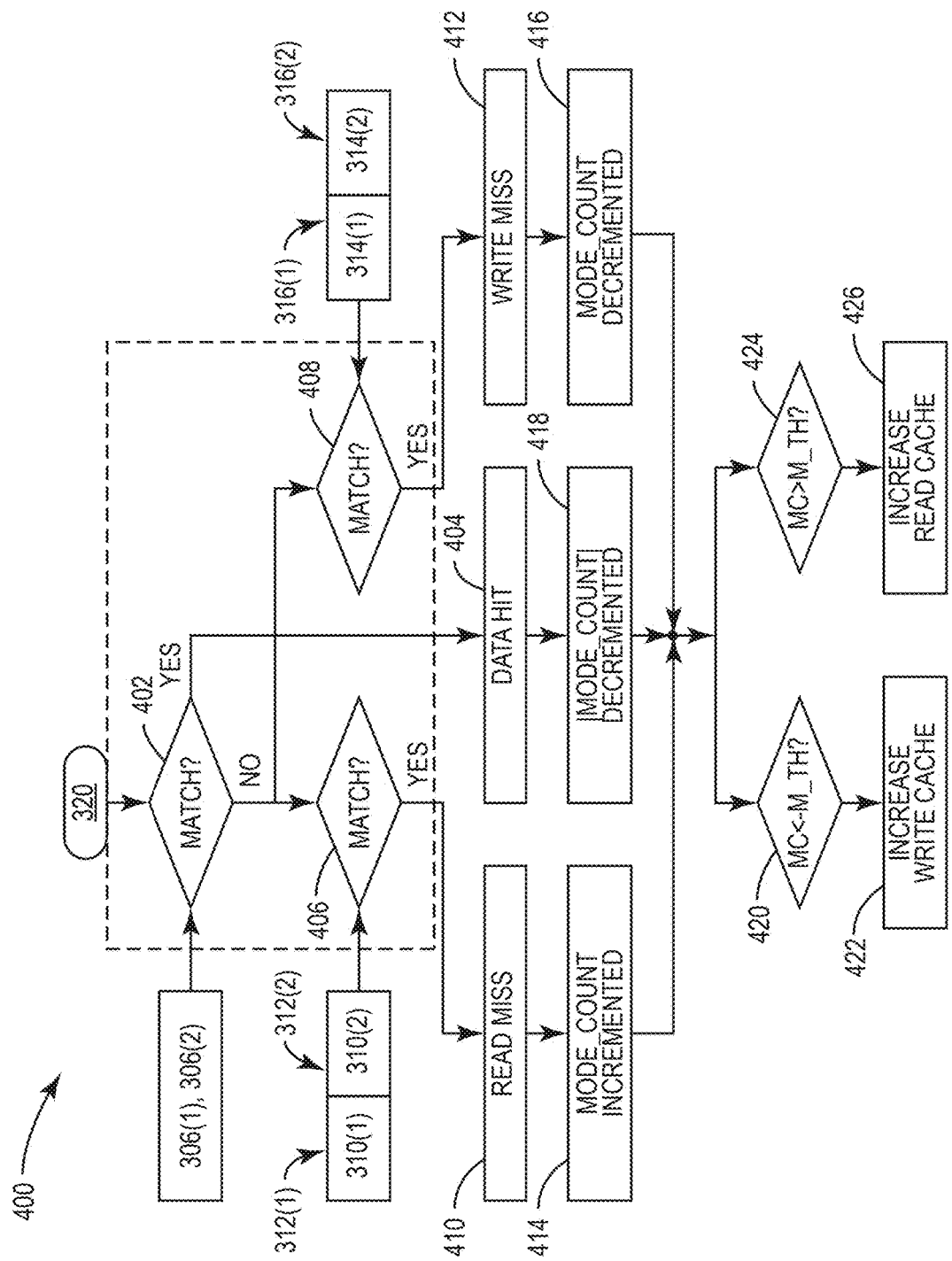
FIG. 4 is a flowchart illustrating the process of determining the mode count employed in the cache circuit in FIG. 3, according to a pattern of memory transactions.

FIG. 4 is a flowchart of a process 400 of determining the mode count MC in the cache circuit 300 in FIG. 3 and using the mode count MC to select data blocks 304 to store in the data registers 306(1), 306(2). Thus, the process 400 is described with reference to FIG. 3 and FIG. 4. The process 400 is described with continued reference to FIG. 3. The process 400 may be initiated each time a memory read transaction 308R is received in the cache circuit 300. The control circuit 318 first determines (block 402) whether the read memory address 320 in the memory read transaction 308R corresponds to one of the data blocks 304 stored in either the data register 306(1) or the data register 306(2) and generates (block 404) the hit signal HIT in response to determining that (YES at block 402) the data block 304 corresponding to the read memory address 320 is stored in one of the data registers 306(1), 306(2). The determination of whether to generate the hit signal HIT may be implemented by various methods according to the circuits in the cache circuit 300. For example, memory address registers (not shown in FIG. 3) indicating the memory addresses corresponding to the data registers 306(1), 306(2) may be included in the cache circuit 300 separate from the read address registers 310(1), 310(2) and the write address registers 314(1), 314(2), and the contents of the not shown memory registers may be compared to the read memory address. Alternatively, since the data registers 306(1), 306(2) store data blocks 304 corresponding to the memory addresses 312(1) and 312(2), the memory addresses 316(1) and 316(2), or one of the memory addresses 312(1), 312(2) and one of the memory addresses 316(1), 316(2), the cache circuit 300 may include indicators associated with each of the read address registers 310(1), 310(2) and each of the write address registers 314(1), 314(2) to indicate which of the memory addresses 312(1), 312(2) and the memory addresses 316(1), 316(2) corresponds to the data blocks 304 stored in the data registers 306(1), 306(2).

In addition to making a determination of whether to generate the hit signal HIT, the process 400 determines the mode count MC. In response to determining (NO at block 402) that the read memory address 320 does not correspond to the data blocks 304 stored in either of the data registers 306(1), 306(2), the process 400 determines (block 406) whether the read memory address 320 matches either of the memory addresses 312(1), 312(2) in the read address registers 310(1), 310(2) and determines (block 408) whether the read memory address 320 matches either of the memory addresses 316(1), 316(2) in the write address registers 314(1), 314(2).

In response to determining that the read memory address 320 does not correspond to a data block 304 in either of the data registers 306(1), 306(2) but the read memory address 320 is stored in one of the read address registers 310(1), 310(2), a read miss signal RMISS is generated (block 410). Similarly, in response to determining that the read memory address 320 does not correspond to a data block 304 in either of the data registers 306(1), 306(2) but the read memory address 320 is stored in one of the write address registers 314(1), 314(2), a write miss signal WMISS is generated (block 412).

Before continuing the description of the process 400 for determining the mode count MC, a description is first provided regarding how the mode count MC is employed to selectively determine which data blocks 304 are stored in the data registers 306(1), 306(2). Such description will increase understanding of how the mode count MC is generated.

The number of data registers 306(1), 306(2) in the cache circuit 300, which is two (2) in the example in FIG. 3, is equal to the number of read address registers 310(1), 310(2) and also equal to the number of write address registers 314(1), 314(2). Thus, there are three possible states of the data registers 306(1), 306(2) in this example: ST1) the data registers 306(1), 306(2) store the data blocks 304 corresponding to the memory addresses 312(1), 312(2) in the read address registers 310(1), 310(2); ST3) the data registers 306(1), 306(2) store the data blocks 304 corresponding to the memory addresses 316(1), 316(2) in the write address registers 314(1), 314(2); and ST2) the data registers 306(1), 306(2) store one data block 304 corresponding to one of the memory addresses 312(1), 312(2) in the read address registers 310(1), 310(2) and one data block 304 corresponding to one of the memory addresses 316(1), 316(2) in the write address registers 314(1), 314(2). The mode count MC is used to select one of the above states ST1-ST3 of the data registers 306(1), 306(2). It should be understood that a number (K) of states ST1-STK would increase according to the number (T) of data registers 306(1)-306 (T) (where T=>2).

Based on the above, it can be seen that in an example in which there is a first number "N" of the data registers 306(1), 306(2), where N=2 in the above example, and there is a second number "L" of the data blocks 304 corresponding to the read address registers 310(1), 310(2) stored in the data registers 306(1), 306(2), then there is a third number "N-L" of the data blocks 304 corresponding to the write address registers 314(1), 314(2) stored in the data registers 306(1), 306(2).

The data blocks 304 stored in the data registers 306(1), 306(2) may not change in response to a change in the mode count MC until subsequent memory transactions 308. For example, in state ST2, when the data block 304 associated with the memory address 316(1) in the write address register 314(1) is stored in one of the data registers 306(1) and the data block 304 associated with the memory address 312(1) in the read address register 310(1) is stored in the data register 306(2), and the cache circuit 300 changes the state of the data registers 306(1), 306(2) from state ST2 to state ST3 in response to a memory read transaction 308R, the data block 304 corresponding to the memory address 316(2) already stored in the write address register 314(2) may not be stored in the cache circuit 300. Thus, the data register 306(2) may not be immediately updated to include the data block 304 corresponding to the write address register 314 (2). However, in response to a subsequent memory write transaction 308W, the data register 306(2) would be updated to store the data block 304 written to the memory circuit 302 and the write address register 314(2) may be updated to contain the memory address 316(2) corresponding to the memory address targeted in the memory write transaction 308W, unless the targeted memory address is already stored in one of the write address registers 314(1), 314(2).

Returning to the calculation of the mode count MC, in a non-limiting example, the mode count MC may be an integer number in a range from a positive threshold number +M to a negative threshold number −M. The control circuit 318 is programmable to store the positive threshold +M and the negative threshold −M. The mode count MC may be initialized to any value in the range, such as zero (0). A mode count MC having a more positive value indicates that, based on the pattern of most recent memory transactions 308, and assuming a continuation of such pattern; the hit rate would benefit from the data registers 306(1), 306(2) being in state ST1, in which the data blocks 304 correspond to the memory addresses 312(1), 312(2) of the read address registers 310 (1), 310(2). That is, if previously read memory addresses are being read repeatedly, storing data blocks 304 corresponding to the memory read addresses will increase the hit rate.

A mode count MC having a more negative value indicates that, based on the pattern of most recent memory transactions 308 and assuming the pattern will continue; the hit rate would benefit from the data registers 306(1), 306(2) being in state ST3, in which the data blocks 304 correspond to the memory addresses 316(1), 316(2) of the write address registers 314(1), 314(2). The mode count MC having a neutral (e.g., zero) value indicates that state ST2 would provide the best hit rate based on the pattern of most recent memory transactions 308. In ST2, the data registers 306(1), 306(2) store the most recently requested data block 304 corresponding to one of the read address registers 310(1), 310(2), and the most recently written data block 304 corresponding to one of the write address registers 314(1), 314(2).

Returning to the description of the process 400, the mode count MC is adjusted according to whether the cache circuit 300 generates the read miss signal RMISS, the hit signal HIT, or the write miss signal WMISS. Specifically, the mode count MC is incrementally increased (block 414) in response to the read miss signal RMISS, the mode count MC is incrementally decreased (block 416) in response to the write miss signal WMISS, and the absolute value of the mode count MC is incrementally decreased (block 418) in response to the hit signal HIT. As examples, an incremental decrease of an absolute value of the mode count MC in response to the hit signal HIT would incrementally change a mode count MC=+2 to MC=+1, and an incremental decrease of an absolute value of a mode count MC=−2 would be a change to MC=−1.

The process 400 continues to select data blocks 304 to be stored in the data registers 306(1), 306(2) based on the mode count MC. The process 400 includes determining (block 420) whether the mode count MC is less than a negative threshold "−M" and, if the mode count MC is less than the negative threshold −M, increasing (block 422) the number of the data registers 306(0), 306(1) that store data blocks 304 corresponding to the write address registers 314(1), 314(2). For example, if data registers 306(1), 306(2) are in the state ST1 described above, in which the data blocks 304 stored in the data registers 306(1), 306(2) correspond to the memory addresses 312(1), 312(2) of the read address registers 310 (1), 310(2), and the mode count MC is less than the negative threshold −M, the cache circuit 300 changes state to ST2 to use one of the data registers 306(1), 306(2) for storing a data block 304 corresponding to one of the memory addresses 316(1), 316(2) of the write address registers 314(1), 314(2). In a similar example, if the data registers 306(1), 306(2) are in the state ST2, the cache circuit 300 changes to state ST3 in which the data registers 306(1), 306(2) are employed for storing data blocks 304 corresponding to both of the memory addresses 316(1), 316(2).

In addition, the process 400 includes (in parallel or sequential to block 420) determining (block 424) whether the mode count MC is greater than the positive threshold +M. If the mode count MC is greater than the positive threshold +M, the cache circuit 300 increases (block 426) the number of the data registers 306(0), 306(1) that store data blocks 304 corresponding to the read address registers 310(1), 310(2). In this example, if data registers 306(1), 306(2) are in the state ST3 described above, in which the data blocks 304 in the data registers 306(1), 306(2) correspond to the memory addresses 316(1), 316(2) in the write address registers 314(1), 314(2), the cache circuit 300 changes to state ST2 to use one of the data registers 306(1), 306(2) for storing a data block 304 corresponding to one of the memory addresses 312(1), 312(2) and if the data registers 306(1), 306(2) are in the state ST2, the cache circuit 300 changes (at block 426) to state ST1 in which the data registers 306(1), 306(2) are employed for storing data blocks 304 corresponding to both of the memory addresses 312(1), 312(2) of the read address registers 310(1), 310(2).

Figure 5:
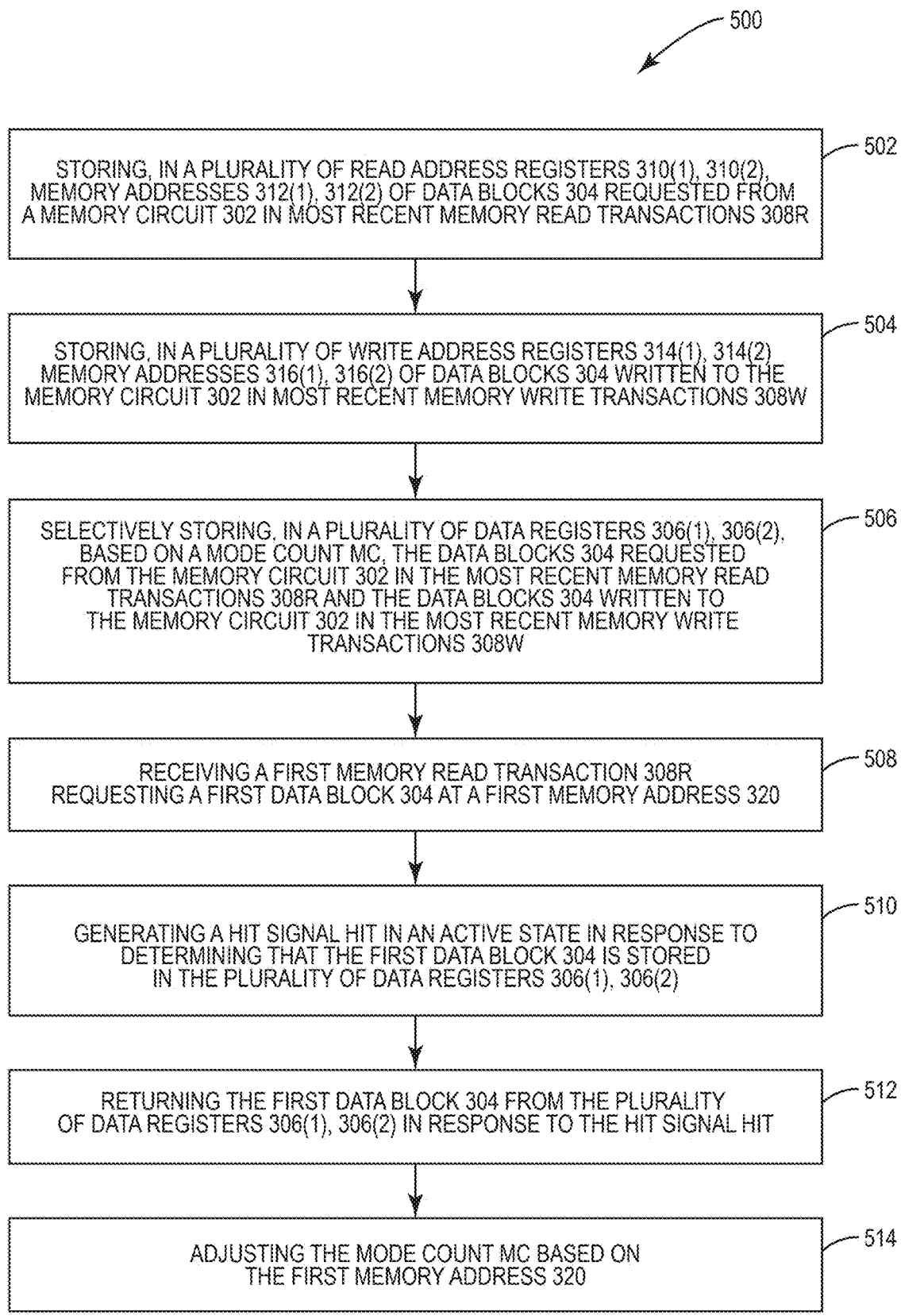
FIG. 5 is a flowchart illustrating a method of a cache circuit coupled to a memory circuit to select the data blocks to be stored based on a mode count that is determined by patterns of memory transactions.

FIG. 5 is a flowchart of method 500 of a cache circuit 300 coupled to a memory circuit to improve a hit rate HR based on a mode count MC. The method includes storing, in a plurality of read address registers 310(1), 310(2), memory addresses 312(1), 312(2) of data blocks 304 requested from a memory circuit 302 in most recent memory read transactions 308R and storing, in a plurality of write address registers 314(1), 314(2) memory addresses 316(1), 316(2) of data blocks 304 written to the memory circuit 302 in most recent memory write transactions 308W (block 504). The method 500 includes selectively storing, in a plurality of data registers 306(1), 306(2), based on a mode count MC, the data blocks 304 requested from the memory circuit 302 in the most recent memory read transactions 308R, and the data blocks 304 written to the memory circuit 302 in the most recent memory write transactions 308W (block 506), and receiving a first memory read transaction 308R requesting a first data block 304 at a first memory address 320 (block 508). The method 500 further includes generating a hit signal HIT in an active state in response to determining that the first data block 304 is stored in the plurality of data registers 306(1), 306(2) (block 510), returning the first data block 304 from the plurality of data registers 306(1), 306(2) in response to the hit signal HIT (block 512); and adjusting the mode count MC based on the first memory address 320 (block 514).

Figure 6:
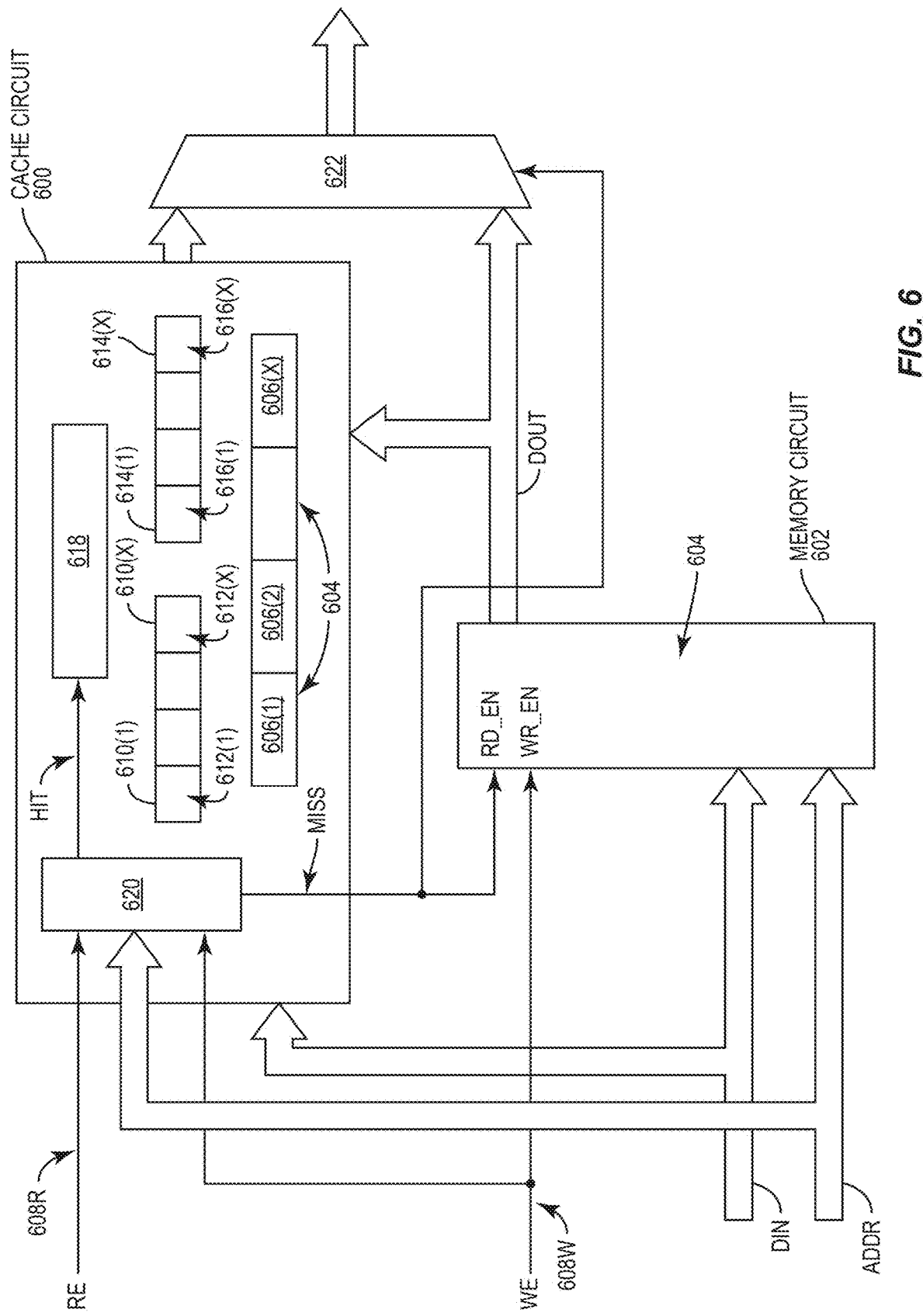
FIG. 6 is a second example of an exemplary cache circuit coupled to a memory circuit configured to adjust the selection of data blocks stored in the data registers based on patterns of memory transactions to improve a hit rate.

FIG. 6 is a second example of an exemplary cache circuit 600 coupled to a memory circuit 602 and configured to adjust the selection of data blocks 604 stored in data registers 606(1)-606(X) based on patterns of memory transactions 608, including memory read transactions 608R and memory write transactions 608W, to improve a hit rate. The memory circuit 602 may be the memory circuit 302 in FIG. 3. In an example of data registers 606(1)-606(X) in which the number X=2, the cache circuit 600 may be the cache circuit 300 in FIG. 3, having some common labeled elements. FIG. 6 is provided as an example to show the number X of data registers 606(1)-606(X) may be any appropriate integer number greater than two (2). Accordingly, the cache circuit 600 would include read address registers 610(1)-610(X) containing memory addresses 612(1)-612(X) and write address registers 614(1)-614(X) containing memory addresses 616(1)-616(X).

In examples in which X>2, the data registers 606(1)-606(X) would have a greater number of states than the states ST1-ST3 in FIG. 3. In an example in which X=3, there may be four (4) states ST1-ST4 where, in state ST1, the data registers 606(1)-606(3) would each contain data blocks 604 corresponding to the memory addresses 616(1)-616(3) in the write address registers 614(1)-614(X). In state ST2, two of the data registers 606(1)-606(3) would contain data blocks 604 corresponding to two of the memory addresses 616(1)-616(3) and one of the data registers 606(1)-606(3) would contain a data block 604 corresponding to one of the memory addresses 612(1)-612(3) in the read address registers 610(1)-610(3). In state ST3, one of the data registers 606(1)-606(3) would contain a data block 604 corresponding to one of the memory addresses 616(1)-616(3) and two of the data registers 606(1)-606(3) would contain data blocks 604 corresponding to two of the memory addresses 612(1)-612(3) in the read address registers 610(1)-610(3). In state ST4, the data registers 606(1)-606(3) would each contain data blocks 604 corresponding to the memory addresses 612(1)-612(3) in the read address registers 610(1)-610(3).

Stated differently, the data registers 606(1)-606(X) storing data blocks written to the memory circuit 602 in write transactions 608W may be referred to as a write cache and the data registers 606(1)-606(X) storing data blocks requested from the memory circuit 602 in read transactions 608R may be referred to as a read cache. The sizes of the write cache and read cache vary with the states ST1-ST4. In state ST1, the cache circuit 600 would have a maximum-sized write cache but no read cache. In state ST4, the cache circuit 600 would have a maximum sized read cache but no write cache. In states ST2 and ST3, the cache circuit 600 would have a write cache and a read cache, but of different sizes. The size of the write cache increases as the states change from ST4 to ST1 and the size of the read cache increases as the states change from ST1 to ST4.

The control circuit 618, logic circuit 620, and multiplexor circuit 622 have the same functions as the control circuit 318, logic circuit 324, and multiplexor circuit 326, respectively, in FIG. 3.

The positive and negative thresholds +M and −M of the mode count MC in the cache circuit 600 may be greater than in the cache circuit 300 based on having a greater number of data registers 606(1)-606(X). In other aspects, however, the cache circuit 600 corresponds to the cache circuit 300 and will not be described again here.

Integrated circuits (ICs) including a cache circuit coupled to a memory circuit and configured to select data blocks to be stored for a higher hit rate based on a mode count that is determined by patterns of memory transactions may be employed in any processor-based device. Examples of such processor-based devices, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 7:
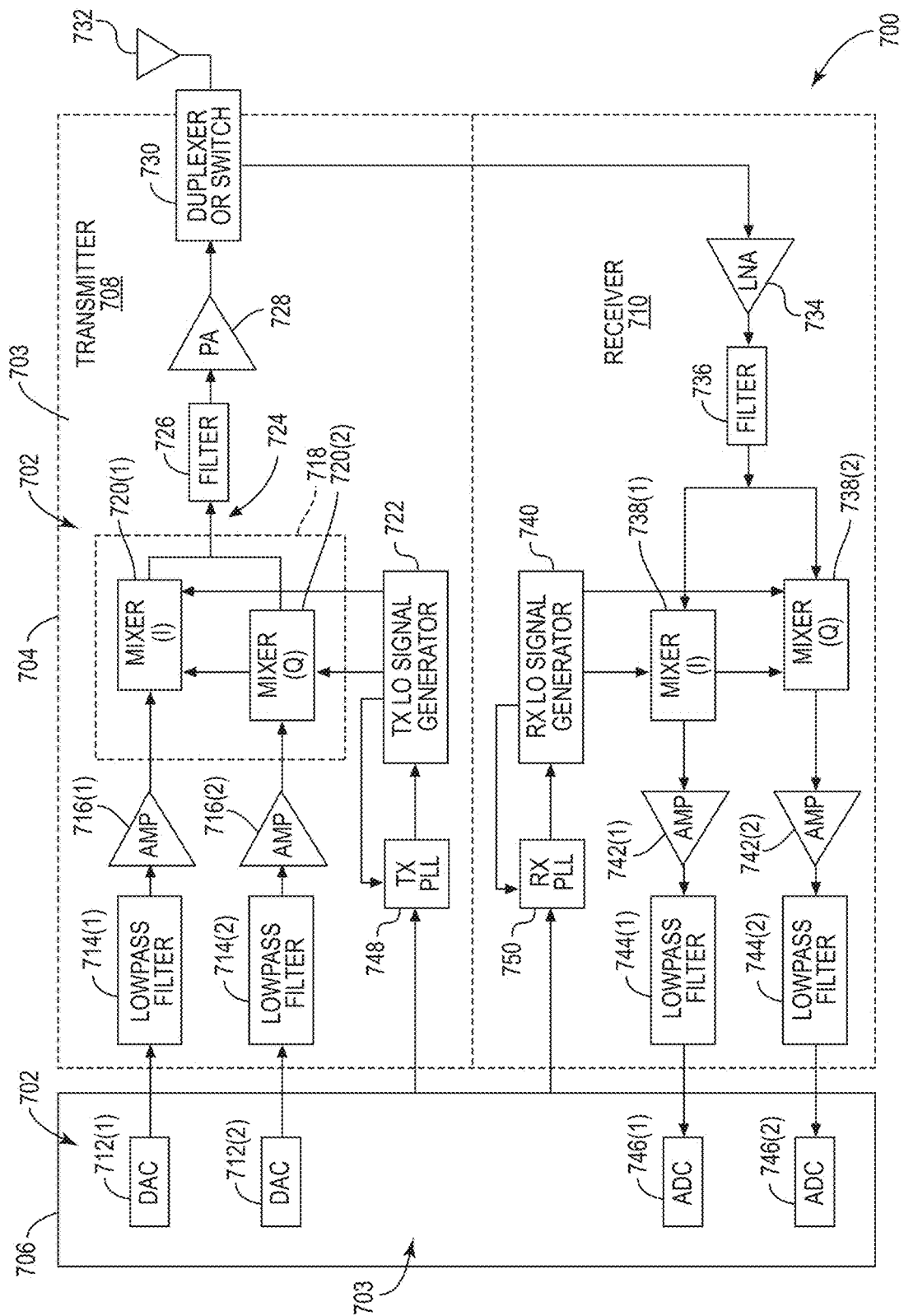
FIG. 7 is a block diagram of an exemplary wireless communications device that includes an integrated circuit (IC), including a cache circuit coupled to a memory circuit and configured to select the data blocks to be stored for a higher hit rate based on a mode count that is determined by patterns of memory transactions.

FIG. 7 illustrates an exemplary wireless communications device 700 that includes radio-frequency (RF) components formed from one or more ICs 702, wherein any of the ICs 702 may include a cache circuit coupled to a memory circuit and configured to select the data blocks to be stored for a higher hit rate based on a mode count that is determined by patterns of memory transactions, such as the cache circuit in any of FIGS. 1, 3, and 6. The wireless communications device 700 may include or be provided in any of the above-referenced devices as examples. As shown in FIG. 7, the wireless communications device 700 includes a transceiver 704 and a data processor 706. The data processor 706 may include a memory to store data and program codes. The transceiver 704 includes a transmitter 708 and a receiver 710 that support bi-directional communications. In general, the wireless communications device 700 may include any number of transmitters 708 and/or receivers 710 for any number of communication systems and frequency bands. All or a portion of the transceiver 704 may be implemented on one or more analog ICs, RF ICs (RFICs), mixed-signal ICs, etc.

The transmitter 708 or the receiver 710 may be implemented with a super-heterodyne architecture or a direct-conversion architecture. In the super-heterodyne architecture, a signal is frequency-converted between RF and baseband in multiple stages, for example, from RF to an intermediate frequency (IF) in one stage and then from IF to baseband in another stage for the receiver 710. In the direct-conversion architecture, a signal is frequency-converted between RF and baseband in one stage. The super-heterodyne and direct-conversion architectures may use different circuit blocks and/or have different requirements. In the wireless communications device 700 in FIG. 7, the transmitter 708 and the receiver 710 are implemented with the direct-conversion architecture.

In the transmit path, the data processor 706 processes data to be transmitted and provides I and Q analog output signals to the transmitter 708. In the exemplary wireless communications device 700, the data processor 706 includes digital-to-analog converters (DACs) 712(1), 712(2) for converting digital signals generated by the data processor 706 into the I and Q analog output signals (e.g., I and Q output currents) for further processing.

Within the transmitter 708, lowpass filters 714(1), 714(2) filter the I and Q analog output signals, respectively, to remove undesired signals caused by the prior digital-to-analog conversion. Amplifiers (AMPs) 716(1), 716(2) amplify the signals from the lowpass filters 714(1), 714(2), respectively, and provide I and Q baseband signals. An upconverter 718 upconverts the I and Q baseband signals with I and Q transmit (TX) local oscillator (LO) signals through mixers 720(1), 720(2) from a TX LO signal generator 722 to provide an upconverted signal 724. A filter 726 filters the upconverted signal 724 to remove undesired signals caused by the frequency up-conversion as well as noise in a receive frequency band. A power amplifier (PA) 728 amplifies the upconverted signal 724 from the filter 726 to obtain the desired output power level and provides a transmit RF signal. The transmit RF signal is routed through a duplexer or switch 730 and transmitted via an antenna 732.

In the receive path, the antenna 732 receives signals transmitted by base stations and provides a received RF signal, which is routed through the duplexer or switch 730 and provided to a low noise amplifier (LNA) 734. The duplexer or switch 730 is designed to operate with a specific receive (RX)-to-TX duplexer frequency separation, such that RX signals are isolated from TX signals. The received RF signal is amplified by the LNA 734 and filtered by a filter 736 to obtain a desired RF input signal. Down-conversion mixers 738(1), 738(2) mix the output of the filter 736 with I and Q RX LO signals (i.e., LO_I and LO_Q) from an RX LO signal generator 740 to generate I and Q baseband signals. The I and Q baseband signals are amplified by AMPs 742(1), 742(2) and further filtered by lowpass filters 744(1), 744(2) to obtain I and Q analog input signals, which are provided to the data processor 706. In this example, the data processor 706 includes analog-to-digital converters (ADCs) 746(1), 746(2) for converting the analog input signals into digital signals to be further processed by the data processor 706.

In the wireless communications device 700 of FIG. 7, the TX LO signal generator 722 generates the I and Q TX LO signals used for frequency up-conversion, while the RX LO signal generator 740 generates the I and Q RX LO signals used for frequency down-conversion. Each LO signal is a periodic signal with a particular fundamental frequency. A TX phase-locked loop (PLL) circuit 748 receives timing information from the data processor 706 and generates a control signal used to adjust the frequency and/or phase of the TX LO signals from the TX LO signal generator 722. Similarly, an RX PLL circuit 750 receives timing information from the data processor 706 and generates a control signal used to adjust the frequency and/or phase of the RX LO signals from the RX LO signal generator 740.

Figure 8:
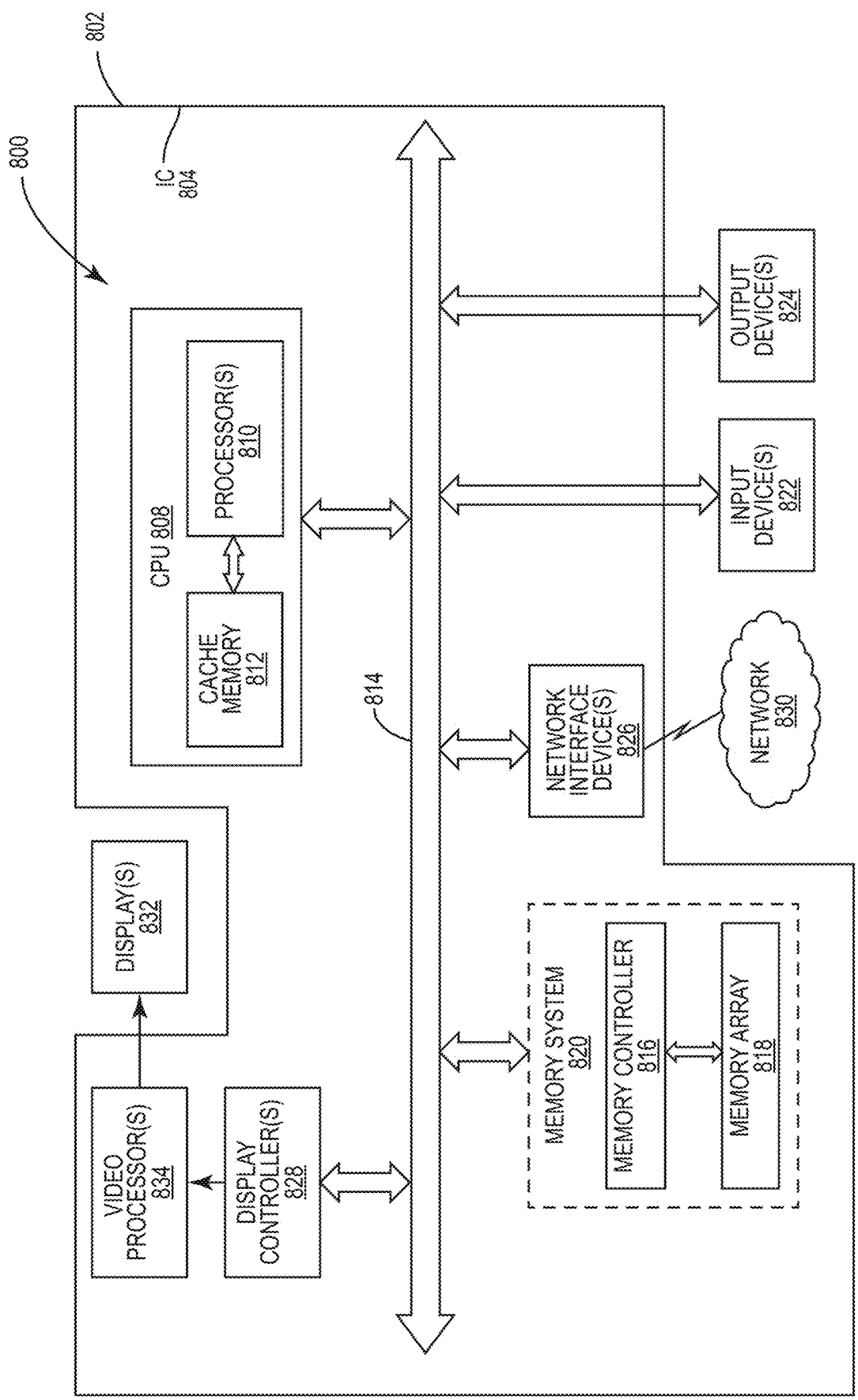
FIG. 8 is a block diagram of an exemplary processor-based system that includes radio-frequency (RF) components that can be disposed on ICs, including a cache circuit coupled to a memory circuit and configured to select the data blocks to be stored for a higher hit rate based on a mode count that is determined by patterns of memory transactions.

In this regard, FIG. 8 illustrates an example of a processor-based system 800 that can include ICs with cache circuit coupled to a memory circuit and configured to select the data blocks to be stored for a higher hit rate based on a mode count that is determined by patterns of memory transactions, such as the cache circuit in any of FIGS. 1, 3, and 6. The processor-based system 800 includes a central processing unit (CPU) 808 that includes one or more processors 810, which may also be referred to as CPU cores or processor cores. The CPU 808 may have cache memory 812 coupled to the CPU 808 for rapid access to temporarily stored data. The CPU 808 is coupled to a system bus 814 and can intercouple master and slave devices included in the processor-based system 800. As is well known, the CPU 808 communicates with these other devices by exchanging address, control, and data information over the system bus 814. For example, the CPU 808 can communicate bus transaction requests to a memory controller 816, as an example of a slave device. Although not illustrated in FIG. 8, multiple system buses 814 could be provided, wherein each system bus 814 constitutes a different fabric.

Other master and slave devices can be connected to the system bus 814. As illustrated in FIG. 8, these devices can include a memory system 820 that includes the memory controller 816 and a memory array(s) 818, one or more input devices 822, one or more output devices 824, one or more network interface devices 826, and one or more display controllers 828, as examples. The input device(s) 822 can include any type of input device, including, but not limited to, input keys, switches, voice processors, etc. The output device(s) 824 can include any type of output device, including, but not limited to, audio, video, other visual indicators, etc. The network interface device(s) 826 can be any device configured to allow an exchange of data to and from a network 830. The network 830 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 826 can be configured to support any type of communications protocol desired.

The CPU 808 may also be configured to access the display controller(s) 828 over the system bus 814 to control information sent to one or more displays 832. The display controller(s) 828 sends information to the display(s) 832 to be displayed via one or more video processor(s) 834, which processes the information to be displayed into a format suitable for the display(s) 832. The display(s) 832 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium wherein any such instructions are executed by a processor or other processing device, or combinations of both. The devices and components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from and write information to the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Implementation examples are described in the following numbered clauses:

1. A cache circuit configured to couple to a memory circuit, the cache circuit comprising:
   a plurality of read address registers configured to store memory addresses of data blocks requested from a memory circuit in most recent memory read transactions;
   a plurality of write address registers configured to store memory addresses of data blocks written to the memory circuit in most recent memory write transactions;
   a plurality of data registers configured to selectively store, based on a mode count, the data blocks requested from the memory circuit in the most recent memory read transactions and the data blocks written to the memory circuit in the most recent memory write transactions; and
   a control circuit configured to:
      receive a first memory read transaction requesting a first data block at a first memory address;
      generate a hit signal in an active state in response to determining that the first data block is stored in the plurality of data registers;
      return the first data block from the plurality of data registers in response to the hit signal; and
      adjust the mode count based on the first memory address.

2. The cache circuit of clause 1, wherein:
   the plurality of data registers stores a first number N of the data blocks requested from the memory circuit in the most recent memory read transactions and written to the memory circuit in the most recent memory write transactions;
   the plurality of read address registers stores memory addresses of N most recent memory read transactions; and
   the plurality of write address registers stores memory addresses of N most recent memory write transactions.

3. The cache circuit of clause 2, wherein:
   a second number L of the data registers in the plurality of data registers store data blocks corresponding to memory addresses stored in the plurality of read address registers;
   a third number N-L of the data registers in the plurality of data registers store data blocks corresponding to memory addresses stored in the plurality of write address registers; and
   the second number L is adjusted from zero (0) to N depending on the mode count.

4. The cache circuit of clause 3, wherein:
   in response to the mode count being between a positive threshold and a negative threshold, the second number L is unchanged;
   in response to the mode count being greater than the positive threshold, the second number L is increased; and
   in response to the mode count being less than the negative threshold, the second number L is decreased.

5. The cache circuit of any of clause 1 to clause 4, wherein the control circuit is further configured to:
   in response to the hit signal being in the active state, decrease an absolute value of the mode count;
   determine whether the first memory address matches a memory address in either the plurality of read address registers or the plurality of write address registers; and
   in response to the hit signal being in an inactive state:
      decrease the mode count in response to determining the first memory address matches a memory address in either the plurality of read address registers or the plurality of write address registers; and
      increase the mode count in response to determining the first memory address does not match a memory address in either the plurality of read address registers or the plurality of write address registers.

6. The cache circuit of any of clause 1 to clause 5, the control circuit further comprising:
   a first comparator configured to compare the first memory address to the memory addresses stored in each of the plurality of read address registers; and
   a second comparator configured to compare the first memory address to the memory addresses stored in each of the plurality of write address registers.

7. The cache circuit of clause 6, the control circuit further comprising:
   a first plurality of indicators, each corresponding to a read address register of the plurality of read address registers and each configured to indicate whether a first data block corresponding to the memory address in the read address register is stored in the plurality of data registers; and
   a second plurality of indicators, each corresponding to a write address register of the plurality of write address registers and each configured to indicate whether a second data block corresponding to the memory address in the corresponding write address register is stored in the plurality of data registers;
   wherein the control circuit is further configured to generate the hit signal in the active state in response to:
      the first comparator indicating that the first memory address matches a second memory address in a read address register of the plurality of read address registers, and the first plurality of indicators indicates that the second memory address corresponds to one of the data blocks stored in the plurality of data registers; or
      the second comparator indicating that the first memory address matches a third memory address in a write address register of the plurality of write address registers, and the second plurality of indicators indicates that the third memory address corresponds to one of the data blocks stored in the plurality of data registers.

8. The cache circuit of any of clause 1 to clause 7, the control circuit further configured to:
   generate the hit signal in an inactive state in response to determining that the first data block is not stored in the plurality of data registers.

9. The cache circuit of any of clause 4 to clause 8, wherein the control circuit is programmable to store the positive threshold and the negative threshold.

10. The cache circuit of any of clause 1 to clause 9, integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

11. An integrated circuit (IC) comprising:
   a memory circuit;
   a plurality of processors configured to access write data blocks to the memory circuit and read data blocks from the memory circuit; and
   a cache circuit coupled to the memory circuit, the cache circuit comprising:
      a plurality of read address registers configured to store memory addresses of data blocks requested from the memory circuit in most recent memory read transactions;
      a plurality of write address registers configured to store memory addresses of data blocks written to the memory circuit in most recent memory write transactions;
      a plurality of data registers configured to selectively store, based on a mode count, the data blocks requested from the memory circuit in the most recent memory read transactions and the data blocks written to the memory circuit in the most recent memory write transactions; and
      a control circuit configured to:
         receive a first memory read transaction requesting a first data block at a first memory address;
         generate a hit signal in an active state in response to determining that the first data block is stored in the plurality of data registers;
         return the first data block from the plurality of data registers in response to the hit signal; and
         adjust the mode count based on the first memory address.

12. The IC of clause 11, wherein:
   the plurality of data registers stores a first number N of the data blocks requested from the memory circuit in the most recent memory read transactions and written to the memory circuit in the most recent memory write transactions;
   the plurality of read address registers stores memory addresses of N most recent memory read transactions; and
   the plurality of write address registers stores memory addresses of N most recent memory write transactions.

13. The IC of clause 12, wherein:
   a second number L of the data registers in the plurality of data registers store data blocks corresponding to memory addresses stored in the plurality of read address registers;
   a third number N-L of the data registers in the plurality of data registers store data blocks corresponding to memory addresses stored in the plurality of write address registers; and
   the second number L is adjusted from zero (0) to N depending on the mode count.

14. The IC of clause 13, wherein:
   in response to the mode count being between a positive threshold and a negative threshold, the second number L is unchanged;
   in response to the mode count being greater than the positive threshold, the second number L is increased; and
   in response to the mode count being less than the negative threshold, the second number L is decreased.

15. The IC of any of clause 11 to clause 14, wherein the control circuit is further configured to:
   in response to the hit signal being in the active state, decrease an absolute value of the mode count;
   determine whether the first memory address matches a memory address in either the plurality of read address registers or the plurality of write address registers; and
   in response to the hit signal being in an inactive state:
      decrease the mode count in response to determining the first memory address matches a memory address in either the plurality of read address registers or the plurality of write address registers; and
      increase the mode count in response to determining the first memory address does not match a memory address in either the plurality of read address registers or the plurality of write address registers.

16. The IC of any of clause 11 to clause 15, the control circuit further comprising:
   a first comparator configured to compare the first memory address to the memory addresses stored in each of the plurality of read address registers; and
   a second comparator configured to compare the first memory address to the memory addresses stored in each of the plurality of write address registers.

17. The cache circuit of clause 16, the control circuit further comprising:
   a first plurality of indicators, each corresponding to a read address register of the plurality of read address registers and each configured to indicate whether the memory address in the read address register corresponds to one of the data blocks stored in the plurality of data registers; and
   a second plurality of indicators, each corresponding to a write address register of the plurality of write address registers and each configured to indicate whether the memory address in the corresponding write address register corresponds to one of the data blocks stored in the plurality of data registers;
   wherein the control circuit is further configured to generate the hit signal in the active state in response to:
      the first comparator indicating that the first memory address matches a second memory address in a read address register of the plurality of read address registers, and the first plurality of indicators indicates that a first data block corresponding to the second memory address is stored in the plurality of data registers; or
      the second comparator indicating that the first memory address matches a third memory address in a write address register of the plurality of write address registers, and the second plurality of indicators indicates that a second data block corresponding to the third memory address is stored in the plurality of data registers.

18. A method of a cache circuit coupled to a memory circuit, the method comprising:

storing, in a plurality of read address registers, memory addresses of first data blocks requested from the memory circuit in most recent memory read transactions;

storing, in a plurality of write address registers, memory addresses of second data blocks written to the memory circuit in most recent memory write transactions;

selectively storing, in a plurality of data registers, based on a mode count, the first data blocks requested from the memory circuit in the most recent memory read transactions and the second data blocks written to the memory circuit in the most recent memory write transactions;

receiving a first memory read transaction requesting a first data block at a first memory address;

generating a hit signal in an active state in response to determining that the first data block is stored in the plurality of data registers;

returning the first data block from the plurality of data registers in response to the hit signal; and adjusting the mode count based on the first memory address.

19. The method of clause 18, further comprising:
selectively storing, in the plurality of data registers, a first number N of the first data blocks requested from the memory circuit in the most recent memory read transactions and the second data blocks written to the memory circuit in the most recent memory write transactions;
storing memory addresses of N most recent memory write transactions in the plurality of write address registers; and
storing memory addresses of N most recent memory read transactions in the plurality of read address registers.

20. The method of clause 19, further comprising:
storing, in the plurality of data registers, a second number L of the first data blocks corresponding to memory addresses stored in the plurality of read address registers;
storing, in the plurality of data registers, a third number N-L of the second data blocks corresponding to memory addresses stored in the plurality of write address registers; and
adjusting the second number L from zero (0) to N depending on the mode count.

21. The method of clause 20, wherein:
increasing the second number L in response to the mode count being greater than a positive threshold;
decreasing the second number L in response to the mode count being less than a negative threshold; and
leaving the second number L unchanged in response to the mode count being between the positive threshold and the negative threshold.

22. The method of any of clause 18 to clause 21, further comprising:
decreasing an absolute value of the mode count in response to the hit signal being in the active state;
determining whether the first memory address matches a memory address in either the plurality of read address registers or the plurality of write address registers; and
in response to the hit signal being in an inactive state:
decreasing the mode count in response to determining the first memory address matches a memory address in either the plurality of read address registers or the plurality of write address registers; and
increasing the mode count in response to determining the first memory address does not match a memory address in either the plurality of read address registers or the plurality of write address registers.

23. The method of any of clause 18 to clause 22, further comprising:
comparing, in a first comparator, the first memory address to the memory addresses stored in each of the plurality of read address registers; and
comparing, in a second comparator, the first memory address to the memory addresses stored in each of the plurality of write address registers.

24. The method of clause 23, further comprising:
indicating, in a first plurality of indicators, each corresponding to a read address register of the plurality of read address registers, whether the first data block corresponding to the memory address in the read address register is stored in the plurality of data registers;
indicating, in a second plurality of indicators, each corresponding to a write address register of the plurality of write address registers, whether the second data block corresponding to the memory address in the corresponding write address register is stored in the plurality of data registers;
generating the hit signal in the active state in response to:
the first comparator indicating that the first memory address matches a second memory address in a read address register of the plurality of read address registers, and the first plurality of indicators indicating that the second memory address corresponds to one of the data blocks stored in the plurality of data registers; or
the second comparator indicating that the first memory address matches a third memory address in a write address register of the plurality of write address registers, and the second plurality of indicators indicating that the third memory address corresponds to one of the data blocks stored in the plurality of data registers.

What is claimed is:
1. A cache circuit configured to couple to a memory circuit, the cache circuit comprising:
a plurality of read address registers configured to store memory addresses of data blocks requested from a memory circuit in most recent memory read transactions;
a plurality of write address registers configured to store memory addresses of data blocks written to the memory circuit in most recent memory write transactions;
a plurality of data registers configured to selectively store, based on a mode count, the data blocks requested from the memory circuit in the most recent memory read transactions and the data blocks written to the memory circuit in the most recent memory write transactions; and
a control circuit configured to:
receive a first memory read transaction requesting a first data block at a first memory address;

generate a hit signal in an active state in response to determining that the first data block is stored in the plurality of data registers;
return the first data block from the plurality of data registers in response to the hit signal; and
adjust the mode count based on the first memory address.

2. The cache circuit of claim 1, wherein:
the plurality of data registers stores a first number N of the data blocks requested from the memory circuit in the most recent memory read transactions and written to the memory circuit in the most recent memory write transactions;
the plurality of read address registers stores memory addresses of N most recent memory read transactions; and
the plurality of write address registers stores memory addresses of N most recent memory write transactions.

3. The cache circuit of claim 2, wherein:
a second number L of the data registers in the plurality of data registers store data blocks corresponding to memory addresses stored in the plurality of read address registers;
a third number N-L of the data registers in the plurality of data registers store data blocks corresponding to memory addresses stored in the plurality of write address registers; and
the second number L is adjusted from zero (0) to N depending on the mode count.

4. The cache circuit of claim 3, wherein:
in response to the mode count being between a positive threshold and a negative threshold, the second number L is unchanged;
in response to the mode count being greater than the positive threshold, the second number L is increased; and
in response to the mode count being less than the negative threshold, the second number L is decreased.

5. The cache circuit of claim 1, wherein the control circuit is further configured to:
in response to the hit signal being in the active state, decrease an absolute value of the mode count;
determine whether the first memory address matches a memory address in either the plurality of read address registers or the plurality of write address registers; and
in response to the hit signal being in an inactive state:
  decrease the mode count in response to determining the first memory address matches a memory address in either the plurality of read address registers or the plurality of write address registers; and
  increase the mode count in response to determining the first memory address does not match a memory address in either the plurality of read address registers or the plurality of write address registers.

6. The cache circuit of claim 1, the control circuit further comprising:
a first comparator configured to compare the first memory address to the memory addresses stored in each of the plurality of read address registers; and
a second comparator configured to compare the first memory address to the memory addresses stored in each of the plurality of write address registers.

7. The cache circuit of claim 6, the control circuit further comprising:
a first plurality of indicators, each corresponding to a read address register of the plurality of read address registers and each configured to indicate whether a first data block corresponding to the memory address in the read address register is stored in the plurality of data registers; and
a second plurality of indicators, each corresponding to a write address register of the plurality of write address registers and each configured to indicate whether a second data block corresponding to the memory address in the corresponding write address register is stored in the plurality of data registers;
wherein the control circuit is further configured to generate the hit signal in the active state in response to:
  the first comparator indicating that the first memory address matches a second memory address in a read address register of the plurality of read address registers, and the first plurality of indicators indicates that the second memory address corresponds to one of the data blocks stored in the plurality of data registers; or
  the second comparator indicating that the first memory address matches a third memory address in a write address register of the plurality of write address registers, and the second plurality of indicators indicates that the third memory address corresponds to one of the data blocks stored in the plurality of data registers.

8. The cache circuit of claim 1, the control circuit further configured to:
generate the hit signal in an inactive state in response to determining that the first data block is not stored in the plurality of data registers.

9. The cache circuit of claim 4, wherein the control circuit is programmable to store the positive threshold and the negative threshold.

10. The cache circuit of claim 1 integrated into a device selected from the group consisting of: a set-top box; an entertainment unit; a navigation device; a communications device; a fixed location data unit; a mobile location data unit; a global positioning system (GPS) device; a mobile phone; a cellular phone; a smartphone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; an avionics system; a drone; and a multicopter.

11. An integrated circuit (IC) comprising:
a memory circuit;
a plurality of processors configured to access write data blocks to the memory circuit and read data blocks from the memory circuit; and
a cache circuit coupled to the memory circuit, the cache circuit comprising:
  a plurality of read address registers configured to store memory addresses of data blocks requested from the memory circuit in most recent memory read transactions;
  a plurality of write address registers configured to store memory addresses of data blocks written to the memory circuit in most recent memory write transactions;
  a plurality of data registers configured to selectively store, based on a mode count, the data blocks requested from the memory circuit in the most recent memory read transactions and the data blocks written to the memory circuit in the most recent memory write transactions; and a control circuit configured to:
receive a first memory read transaction requesting a first data block at a first memory address;
generate a hit signal in an active state in response to determining that the first data block is stored in the plurality of data registers;
return the first data block from the plurality of data registers in response to the hit signal; and
adjust the mode count based on the first memory address.

12. The IC of claim 11, wherein:
the plurality of data registers stores a first number N of the data blocks requested from the memory circuit in the most recent memory read transactions and written to the memory circuit in the most recent memory write transactions;
the plurality of read address registers stores memory addresses of N most recent memory read transactions; and
the plurality of write address registers stores memory addresses of N most recent memory write transactions.

13. The IC of claim 12, wherein:
a second number L of the data registers in the plurality of data registers store data blocks corresponding to memory addresses stored in the plurality of read address registers;
a third number N-L of the data registers in the plurality of data registers store data blocks corresponding to memory addresses stored in the plurality of write address registers; and
the second number L is adjusted from zero (0) to N depending on the mode count.

14. The IC of claim 13, wherein:
in response to the mode count being between a positive threshold and a negative threshold, the second number L is unchanged;
in response to the mode count being greater than the positive threshold, the second number L is increased; and
in response to the mode count being less than the negative threshold, the second number L is decreased.

15. The IC of claim 11, wherein the control circuit is further configured to:
in response to the hit signal being in the active state, decrease an absolute value of the mode count;
determine whether the first memory address matches a memory address in either the plurality of read address registers or the plurality of write address registers; and
in response to the hit signal being in an inactive state:
decrease the mode count in response to determining the first memory address matches a memory address in either the plurality of read address registers or the plurality of write address registers; and
increase the mode count in response to determining the first memory address does not match a memory address in either the plurality of read address registers or the plurality of write address registers.

16. The IC of claim 11, the control circuit further comprising:
a first comparator configured to compare the first memory address to the memory addresses stored in each of the plurality of read address registers; and a second comparator configured to compare the first memory address to the memory addresses stored in each of the plurality of write address registers.

17. The cache circuit of claim 16, the control circuit further comprising:
a first plurality of indicators, each corresponding to a read address register of the plurality of read address registers and each configured to indicate whether the memory address in the read address register corresponds to one of the data blocks stored in the plurality of data registers; and
a second plurality of indicators, each corresponding to a write address register of the plurality of write address registers and each configured to indicate whether the memory address in the corresponding write address register corresponds to one of the data blocks stored in the plurality of data registers;
wherein the control circuit is further configured to generate the hit signal in the active state in response to:
the first comparator indicating that the first memory address matches a second memory address in a read address register of the plurality of read address registers, and the first plurality of indicators indicates that a first data block corresponding to the second memory address is stored in the plurality of data registers; or
the second comparator indicating that the first memory address matches a third memory address in a write address register of the plurality of write address registers, and the second plurality of indicators indicates that a second data block corresponding to the third memory address is stored in the plurality of data registers.

18. A method of a cache circuit coupled to a memory circuit, the method comprising:
storing, in a plurality of read address registers, memory addresses of first data blocks requested from the memory circuit in most recent memory read transactions;
storing, in a plurality of write address registers, memory addresses of second data blocks written to the memory circuit in most recent memory write transactions;
selectively storing, in a plurality of data registers, based on a mode count, the first data blocks requested from the memory circuit in the most recent memory read transactions and the second data blocks written to the memory circuit in the most recent memory write transactions;
receiving a first memory read transaction requesting a first data block at a first memory address;
generating a hit signal in an active state in response to determining that the first data block is stored in the plurality of data registers;
returning the first data block from the plurality of data registers in response to the hit signal; and
adjusting the mode count based on the first memory address.

19. The method of claim 18, further comprising:
selectively storing, in the plurality of data registers, a first number N of the first data blocks requested from the memory circuit in the most recent memory read transactions and the second data blocks written to the memory circuit in the most recent memory write transactions;
storing memory addresses of N most recent memory write transactions in the plurality of write address registers; and storing memory addresses of N most recent memory read transactions in the plurality of read address registers.

20. The method of claim 19, further comprising:

storing, in the plurality of data registers, a second number L of the first data blocks corresponding to memory addresses stored in the plurality of read address registers;

storing, in the plurality of data registers, a third number N-L of the second data blocks corresponding to memory addresses stored in the plurality of write address registers; and adjusting the second number L from zero (0) to N depending on the mode count.

21. The method of claim 20, wherein:

increasing the second number L in response to the mode count being greater than a positive threshold;

decreasing the second number L in response to the mode count being less than a negative threshold; and leaving the second number L unchanged in response to the mode count being between the positive threshold and the negative threshold.

22. The method of claim 18, further comprising:

decreasing an absolute value of the mode count in response to the hit signal being in the active state;

determining whether the first memory address matches a memory address in either the plurality of read address registers or the plurality of write address registers; and in response to the hit signal being in an inactive state:
  decreasing the mode count in response to determining the first memory address matches a memory address in either the plurality of read address registers or the plurality of write address registers; and
  increasing the mode count in response to determining the first memory address does not match a memory address in either the plurality of read address registers or the plurality of write address registers.

23. The method of claim 18, further comprising:

comparing, in a first comparator, the first memory address to the memory addresses stored in each of the plurality of read address registers; and comparing, in a second comparator, the first memory address to the memory addresses stored in each of the plurality of write address registers.

24. The method of claim 23, further comprising:

indicating, in a first plurality of indicators, each corresponding to a read address register of the plurality of read address registers, whether the first data block corresponding to the memory address in the read address register is stored in the plurality of data registers;

indicating, in a second plurality of indicators, each corresponding to a write address register of the plurality of write address registers, whether the second data block corresponding to the memory address in the corresponding write address register is stored in the plurality of data registers;

generating the hit signal in the active state in response to:
  the first comparator indicating that the first memory address matches a second memory address in a read address register of the plurality of read address registers, and the first plurality of indicators indicating that the second memory address corresponds to one of the data blocks stored in the plurality of data registers; or
  the second comparator indicating that the first memory address matches a third memory address in a write address register of the plurality of write address registers, and the second plurality of indicators indicating that the third memory address corresponds to one of the data blocks stored in the plurality of data registers.

* * * * *